US009002802B2

(12) United States Patent  
Deshmukh et al.

(10) Patent No.: US 9,002,802 B2  
(45) Date of Patent: *Apr. 7, 2015

(54) HIGH THROUGHPUT, RELIABLE REPLICATION OF TRANSFORMED DATA IN INFORMATION SYSTEMS

(75) Inventors: Harish Deshmukh, Mountain View, CA (US); Frank C. Hayes, Palos Verdes Estates, CA (US); Roger C. Raphael, San Jose, CA (US); Paul S. Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,126

(22) Filed: Jul. 12, 2012

(65) Prior Publication Data

US 2012/0278288 A1 Nov. 1, 2012

Related U.S. Application Data

(63) Continuation of application No. 12/631,641, filed on Dec. 4, 2009, now Pat. No. 8,244,686.

(51) Int. Cl.
 *G06F 7/00* (2006.01)
 *G06F 17/30* (2006.01)
(52) U.S. Cl.
 CPC .............................. *G06F 17/30575* (2013.01)
(58) Field of Classification Search
 USPC ........................................................ 707/672
 See application file for complete search history.

(56) References Cited

U.S. PATENT DOCUMENTS 6,018,723 A 1/2000 Siegel et al.
6,609,123 B1 8/2003 Cazemier et al.
(Continued)

FOREIGN PATENT DOCUMENTS

CN 1983282 A1 6/2007
JP H05225019 A 9/1993
(Continued)

OTHER PUBLICATIONS

Oldevik, J., A. Solberg, B. Elvesaeter, A.J. Berre, "Framework for Model Transformation and Code Generation", Proceedings of the Sixth International Enterprise Distributed Object Computing Conference, © 2002 IEEE, 9 pp.
(Continued)

*Primary Examiner* — Truong Vo
(74) *Attorney, Agent, or Firm* — Janaki K. Davda; Konrad, Raynes, Davda & Victor LLP

(57) ABSTRACT

Provided are techniques for, in response to a source object being changed by a local transaction, generating log records, wherein each of the log records includes a sequence identifier, a source system entity modification timestamp, a target key, a target partition identifier, and values of source properties, wherein the source properties are identified using a target key indicator. The log records to process are selected based on a phase value of each log record, wherein the phase value is one of submitted, in-flight, and source system entity state change complete. One or more disjoint partitions are assigned to each of multiple processing instances. Under control of each of the multiple processing instances, it is determined whether to transmit a log record in the one or more disjoint partitions assigned to said processing instance and, in response to determining that the log record is to be transmitted, the log record is transmitted.

24 Claims, 15 Drawing Sheets

(56) References Cited

U.S. PATENT DOCUMENTS

| | | | |
|---|---|---|---|
| 6,795,868 | B1 | 9/2004 | Dingman et al. |
| 6,839,714 | B2 | 1/2005 | Wheeler et al. |
| 7,653,650 | B2 | 1/2010 | Kulkarni et al. |
| 7,765,180 | B2 | 7/2010 | Tamatsu |
| 8,280,840 | B2 | 10/2012 | Mineno |
| 8,639,670 | B2 | 1/2014 | Mineno |
| 2003/0135495 | A1 | 7/2003 | Vagnozzi |
| 2003/0204516 | A1* | 10/2003 | Klosterhalfen et al. ...... 707/100 |
| 2004/0054643 | A1 | 3/2004 | Vemuri et al. |
| 2005/0021567 | A1 | 1/2005 | Holenstein et al. |
| 2005/0193041 | A1 | 9/2005 | Bourbonnais et al. |
| 2005/0289198 | A1 | 12/2005 | Todd |
| 2006/0143238 | A1 | 6/2006 | Tamatsu |
| 2007/0156792 | A1 | 7/2007 | D'Souza et al. |
| 2008/0147703 | A1* | 6/2008 | Behnen et al. ................. 707/102 |
| 2008/0215612 | A1 | 9/2008 | Dettinger et al. |
| 2008/0228697 | A1 | 9/2008 | Adya et al. |
| 2008/0243945 | A1* | 10/2008 | Hanus et al. .................. 707/202 |
| 2008/0281849 | A1 | 11/2008 | Mineno |
| 2009/0171996 | A1 | 7/2009 | Laxminarayanan |
| 2009/0313311 | A1* | 12/2009 | Hoffmann et al. ............ 707/204 |
| 2011/0137864 | A1* | 6/2011 | Deshmukh et al. ............ 707/648 |
| 2012/0323841 | A1 | 12/2012 | Mineno |

FOREIGN PATENT DOCUMENTS

| | | | |
|---|---|---|---|
| JP | 2002099451 | A | 4/2002 |
| JP | 2004220608 | A | 8/2004 |
| JP | 2005527912 | A | 9/2005 |
| JP | 2009277119 | A | 11/2009 |
| WO | 03100666 | A2 | 12/2003 |
| WO | 2004025475 | A1 | 3/2004 |
| WO | 2007083371 | A1 | 7/2007 |

OTHER PUBLICATIONS

PCT International Search Report and Written Opinion, Dec. 8 2011, for PCT/EP2010/068438, Total 11 pp.

Amendment 1, Mar. 1, 2012, for U.S. Appl. No. 12/631,641, filed Dec. 4, 2009 by H. Deshmukh et al., Total 15 pp.

Notice of Allowance 1, Apr. 4, 2012, for U.S. Appl. No. 12/631,641, filed Dec. 4, 2009 by H. Deshmukh et al., Total 11 pp.

Office Action 1, Dec. 1, 2011, for U.S. Appl. No. 12/631,641, filed Dec. 4, 2009 by H. Deshmukh et al., Total 20 pp.

English Abstract for CN1983282A1, published on Jun. 20, 2007, Total 1 p. [English Counterpart is US7653650].

IDS Report, Jun. 19, 2013, from the Jun. 9, 2013 Office Action, Total 4 pp.

English Abstract for JP2005527912A, published Sep. 15, 2005, Total 1 p. [Abstract for corresponding case WO03100666A2].

English Abstract and Machine Translation for JP2002099451A, published Apr. 5, 2002, Total 35 pp.

English Abstract and Machine Translation for JP2004220608A, published Aug. 5, 2004, Total 36 pp.

English Abstract and Machine Translation for JP2009277119A, published Nov. 26, 2009, Total 14 pp.

English Abstract and Machine Translation for JPH05225019A, published Sep. 3, 1993, Total 55 pp.

English Abstract for WO2004025475A1, published Mar. 25, 2004, Total 2 pp.

English Abstract for WO2007083371A1, published Jul. 26, 2007, Total 2 pp.

Information Materials for IDS, Apr. 17, 2014, from the JP Office Action dated Apr. 8, 2014, Total 2 pp.

US Publication No. 2006/143238, dated Jun. 29, 2006, is an English language equivalent of WO2004025475A1, dated Mar. 25, 2004.

US Patent No. 7,765,180, dated Jul. 27, 2010, is an English language equivalent of WO2004025475A1, dated Mar. 25, 2004.

US Publication No. 2008/281849, dated Nov. 13, 2008, is an English language equivalent of WO2007083371A1, dated Jul. 26, 2007.

US Patent No. 8,280,840, dated Oct. 2, 2012, is an English language equivalent of WO2007083371A1, dated Jul. 26, 2007.

US Publication No. 2012/323841, dated Dec. 20, 2012, is an English language equivalent of WO2007083371A1, dated Jul. 26, 2007.

US Patent No. 8,639,670, dated Jan. 28, 2014, is an English language equivalent of WO2007083371A1, dated Jul. 26, 2007.

WO03100666A2, published Dec. 4, 2003, is an English language equivalent of JP2005527912A, dated Sep. 15, 2005.

* cited by examiner

HIGH THROUGHPUT, RELIABLE REPLICATION OF TRANSFORMED DATA IN INFORMATION SYSTEMS

CROSS-REFERENCE TO RELATED APPLICATION

This application is a continuation of U.S. patent application Ser. No. 12/631,641, filed on Dec. 4, 2009, which application is incorporated herein by reference in its entirety.

BACKGROUND

1. Field

Embodiments of the invention relate to high throughput, reliable replication of transformed data in information systems.

2. Description of the Related Art

Information often exists in multiple locations within an organization, within an enterprise, or even more globally across enterprises. Often this information is represented in an optimal way for local applications, and, usually, not all applications within the organization, within an enterprise, or even more globally across enterprises require, use, or even want or are allowed to access all of the information that exists. However, it is increasingly common that more and more of this information is shared and utilized in local applications. The sharing, transformation, and local use of that information is a root capability that allows a consistent view of data, enables cross-selling scenarios, and enables significant business optimization and identification of new business opportunities.

Conventional systems result in high implementation costs, which often are incurred on every deployment of trying to integrate one local source system executing the local applications to some other target system. The local target calls tend to be very specific to the target system and often times very specific to the configuration of that target system. Conventional systems used in replication and data transformation stop short of integrating with local target calls using parameter values derived from the data transformation. This results in a high cost to program the local target calls due to the cost of implementing and integrating the local target calls within the conventional systems. This high cost results in many of these types of projects not being able to be funded in the first place and taking significant time to implement, test, and deploy, particularly at an enterprise level.

Conventional systems that require strong data integrity rely on traditional transaction serialization of the entire workload, sometimes even using two phase commit between the two systems to insure data integrity. This serialization has serious performance consequences on both the source and target systems due to the latency that is introduced into the source system transactions (which now become distributed transactions). This latency means that increased serialization occurs due to more locks being held for longer duration which reduces overall throughput. It also has high availability impacts since the overall system depends on the entire overall system being available all the time. Conventional systems rely on source transaction serialization to order the execution on the target system and, hence, are unable to be fully parallelized to take advantage of high performance clusters.

There is a need for high throughput replication (due to the multiple locations), transformation (due to "local" representations of data, and the applications that run against that data), and the need for data integrity (consistent trusted enterprise-wide data). Thus, there is a need for high throughput, reliable replication of transformed data in information systems.

BRIEF SUMMARY

Provided are a method, computer program product, and system for, in response to a source object being changed by a local transaction, generating log records, wherein each of the log records includes a sequence identifier, a source system entity modification timestamp, a target key, a target partition identifier, and values of source properties, wherein the source properties are identified using a target key indicator. The log records to process are selected based on a phase value of each log record, wherein the phase value is one of submitted, in-flight, and source system entity state change complete. One or more disjoint partitions are assigned to each of multiple processing instances. Under control of each of the multiple processing instances, it is determined whether to transmit a log record in the one or more disjoint partitions assigned to said processing instance and, in response to determining that the log record is to be transmitted, the log record is transmitted.

BRIEF DESCRIPTION OF THE SEVERAL VIEWS OF THE DRAWINGS

Referring now to the drawings in which like reference numbers represent corresponding parts throughout:

FIG. 5 is formed by FIGS. 5A and 5B.

FIG. 8 is formed by FIGS. 8A, 8B, and 8C.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide extensibility mechanisms, maintain system integrity, improve throughput by enabling high degrees of parallelism in how and when the local calls are made that preserve the overall data and transaction integrity.

The capabilities provided by embodiments are implemented in a framework that results in minimal programming for the user of the framework. The core design of the framework itself is also described herein to enable effective implementations and optimizations of this framework.

Figure 1:
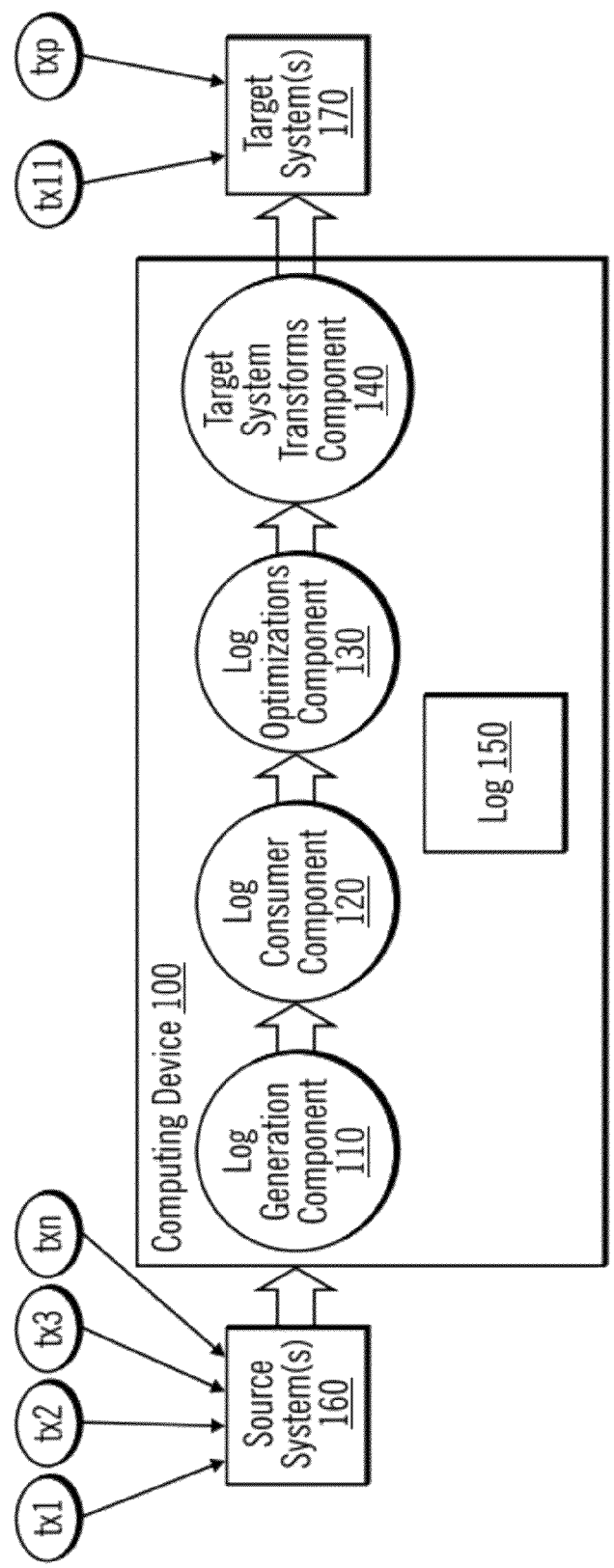
FIG. 1 illustrates a computing architecture in accordance with certain embodiments.

FIG. 1 illustrates a computing architecture in accordance with certain embodiments. A computing device 100 includes a log generation component 110, a log consumer component 120, a log optimizations component 130, a target system transforms component 140, and a log 150. One or more source systems 160 and one or more target systems 170 are coupled to the computing device 100. In certain embodiments, the computing device 100 is a Master Content Server. In certain embodiments, at least one source system 160 is an Enterprise Content Management (ECM) system. In certain embodiments, at least one target system 170 is a Master Data Management (MDM) system.

The source system 160 receives a transaction (e.g., tx1, tx2, tx3 . . . txn) and routes the transaction to the computing device 100. Source local applications at the source system 160 issue the transactions. The transactions change data (e.g., source objects on the source system 160). The computing device 100 performs high throughput, reliable replication of transformed data between information systems as represented by source system labeled 160 and target system labeled 170. The log generation component 110 uses the changed data to generate data in a log as represented by log 150. The details of the structure definition of the log 150 are described in FIG. 3. The log optimizations component 130 processes and optimizes the log 150 and generates additional data in the log 150. The target system transforms component 140 performs data transformation and routes the transformed data to the target system 170, which also generates additional data in the log 150. Transactions (e.g., tx11 . . . txp) may then use the transformed data. Thus, data is changed by the source system 160, and the changed data is transformed by the target system transforms component 140 at the computing device 100.

In certain embodiments, there is one source data change at a time. Each change is tagged with a source transaction identifier. Also, each change is tagged with the operation code (i.e., insert, update or delete) of the source transaction. In certain embodiments, there are multiple rows in the source data change, and each of the rows has multiple attributes.

Within a source transaction, there may be multiple statements to be executed, and there may be data changes for each of the multiple statements. Embodiments apply data transformations for the source transaction having a source transaction identifier. There may be one or more source data changes per transaction. In certain embodiments, function execution order within a single data transformation is provided (i.e., to avoid intermediate exceptions in establishing/maintaining primary key/foreign key relationships).

In certain embodiments, the system illustrated in FIG. 1 may be described as a replication pipeline, starting from detecting deltas in the source system 160 to extraction, transformation, and delivery to the target system 170 in a reliable and correctly ordered way.

Figure 2:
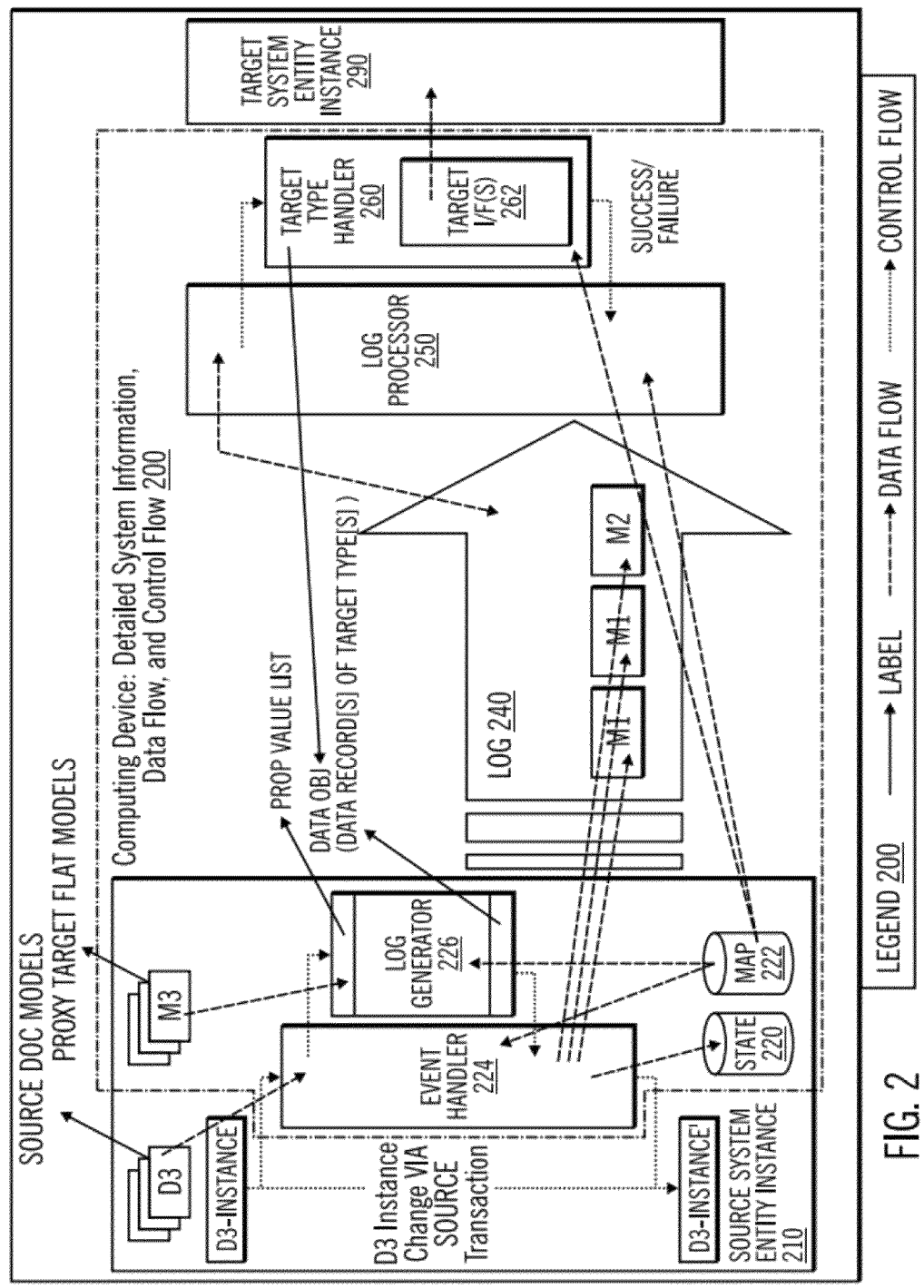
FIG. 2 illustrates a flow of operation in accordance with certain embodiments.

FIG. 2 illustrates a flow of operation in accordance with certain embodiments. In FIG. 2, according to legend 200, a continuous arrow indicates a label, a dashed arrow indicates data flow, and a dotted arrow indicates control flow. A source system entity instance 210 is coupled to a computing device, which is coupled to a target system entity instance 290. The computing device, detailed system information, data flow, and control flow 200 is shown within lines that include both dashes and dots. The computing device 200 is an instance of the computing device 100 (FIG. 1). The source system entity instance 210 is an instance of a source system 160 (FIG. 1). The target system entity instance 290 is an instance of a target system 170 (FIG. 1). In certain embodiments, the computing device 200 is a master content server; the source system entity instance 210 is an enterprise content management system; and the target system entity instance 290 is a master data management system.

The source system entity instance 210 has access to source document models (e.g., D3) and proxy target flat models (e.g., M3). A proxy target flat model may be described as a flattened emulation of a target data model on the source system that has no real instance data. This is used for convenience of implementation and strong system metadata validation checks together with the contents of the map table. For example, D3 may be a metadata document model for a scanned image representing an identity document, such as a drivers license, passport, or birth certificate. This metadata document model is implemented in the data modeling capabilities of the source system. In ECM systems, this may be an object based data model. For example, M3 may be a flat relational representation of the same or similar information as stored in D3 in a DataBase Management System (DBMS) or D3 may be eXtensible Markup Language (XML) or some other data model representation supported by the target system. In certain embodiments, the source document models are object models, and the proxy target flat models are relational models. A D3-Instance is changed via a source transaction to D3-Instance'. For a transaction, the event handler 224 accesses a document model, state information for the transaction from state 220, and a row from a map 222 (labeled "map"). The event handler 224 forwards the document model, the state information, and the row to the log generator 226. The log generator 226 accesses the map 222, converts the source document model into an intermediate model using the row from the map 222, and returns data to the event handler 224. The event handler 224 writes to the log 240. The log processor 250 processes the log. The target type handler 260 uses the map 222 to complete data transformation (from intermediate to target). The target interface(s) (I/F(s)) 262 provide one or more interfaces for invoking appropriate Application Programming Interfaces (APIs) with appropriate parameters. The data values from the completed data transformation are used as parameters to the appropriate application programming interfaces.

In certain embodiments, the functionality of the log generation component 110 (FIG. 1) is implemented with the event handler 224, the log generator 226, state 220, and map 222. In certain embodiments, the functionality of log optimizations component 130 (FIG. 1) is implemented in the log processor 250. In certain embodiments, the functionality of the target system transformations component 140 (FIG. 1) is implemented in the target type handler 260 and the target I/F(s) 262.

Figure 3:
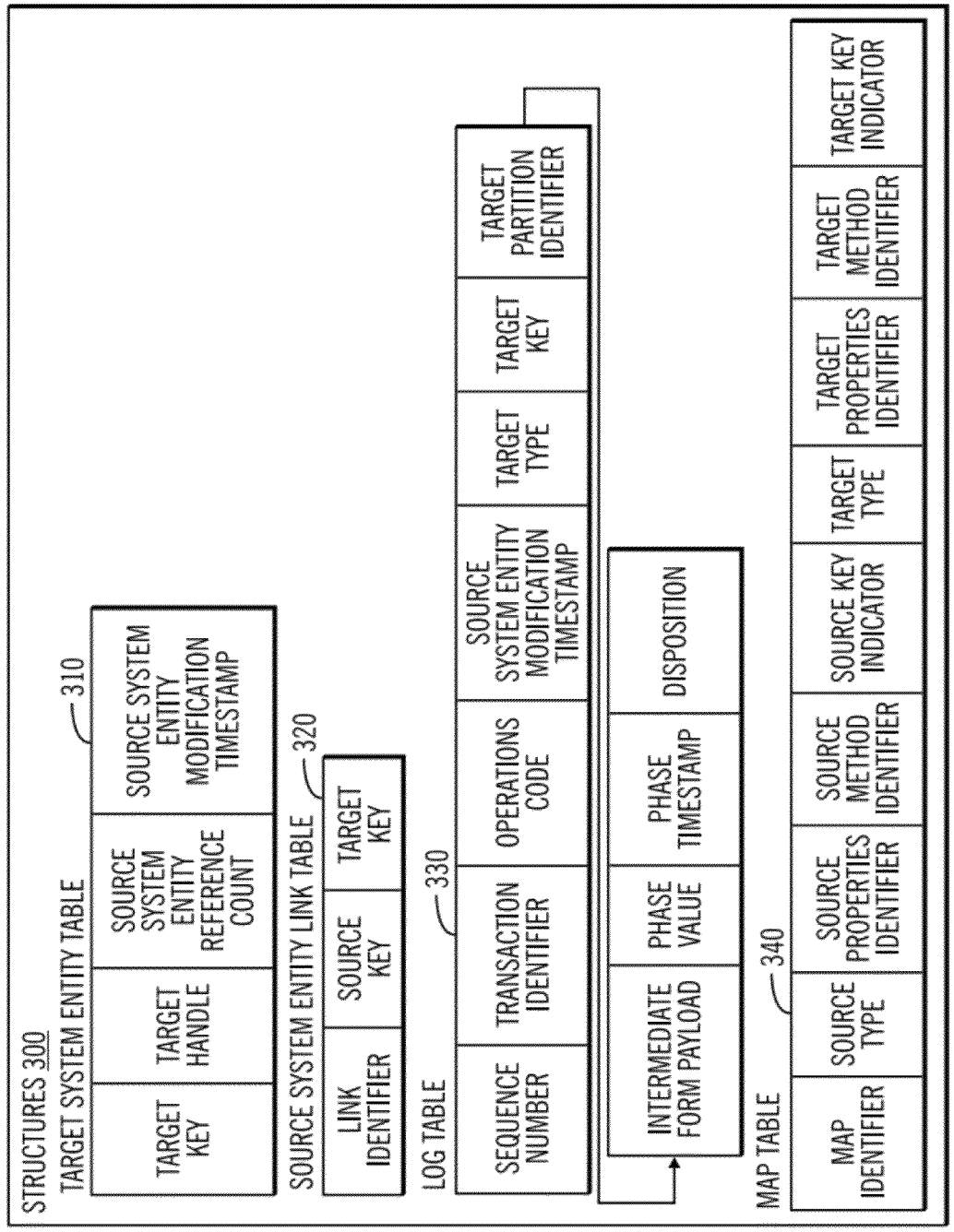
FIG. 3 illustrates structures in accordance with certain embodiments.

FIG. 3 illustrates structures 300 in accordance with certain embodiments. In certain embodiments, the structures 300 are stored in state 220. The structures 300 include a target system entity table 310, a source system entity link table 320, a log table 330, and a map table 340. An entity is a type (e.g., a document model). An instance of a source system may have multiple source system entities, and an instance of a target system may have multiple target system entities.

The structures 300 create high data integrity without requiring two phase commit. Also target system entity table 310 and source system entity link table 320 reduce messages and code paths by recognizing duplicates early in the processing.

The target system entity table 310 includes attributes for: a target key, a target handle, a source system entity reference count, and a source system entity modification timestamp.

The source system entity link table 320 includes attributes for: a link identifier, a source key, and a target key. The link identifier may be described as a unique number given to the link. A link is formed between the source data model abstract instances (e.g., documents) and the target data model abstract instances. With embodiments, there is an association 1-1 between the source data model abstract instances (e.g., documents) and the source system entity link table 320, and there is a 1 to many associations between the target system entity table 310 and the link table 320.

If the operation code for a log record is insert, then a link is added (i.e., a row is added to the source system entity link table 320), and the source system entity reference count is incremented. If the operation code is delete, then the link is removed (i.e., by deleting a corresponding row from the source system entity link table 320), and the source system entity reference count is decremented. If the operation code is update, then no changes are needed to the source system entity link table 320 or the source system entity reference count.

In certain embodiments, the log 240 is implemented as log table 330. The log table 330 includes attributes for: a sequence number (which identifies the order in which transactions completed on the source system entity instance 210), a transaction identifier, operations code (i.e., insert, update or delete), source system entity modification timestamp (which indicates the last time the source object was modified), target type, target key, target partition identifier, intermediate form payload (which has values to be transmitted in intermediate form), phase value, phase timestamp, and disposition (e.g., "transmit successful", "transmit failed" or "not transmitted"). In certain embodiments, a monotonic, atomic sequence number generator generates the sequence numbers. In certain embodiments, the target type is a target data type instance for an M3 model. For example, if the document is an identity document, then certain properties, such as name, may be represented with a specific type in the target M3 model. This could be a simple string type, a fixed length character string, or a structure for first name, middle name (or middle initial), and last name. The phase value reflects a phase in a log record lifecycle of: submitted, in-flight, source system entity state change complete, and completed (i.e., target system entity state change complete). After a system cold start, processing can begin based on the phase identified by the phase value. In certain embodiments, the log table 330 also includes a source key that is obtained (e.g., copied over) from the source object, and the source key indicator is used to determine which source properties should be used to generate the source key.

In certain embodiments, the map 222 is implemented as the map table 340. The map table 340 includes attributes for a map identifier, a source type, a source properties identifier, a source method identifier, a source key indicator, a target type, a target properties identifier, a target method identifier, and a target key indicator. Each row of the map table 340 represents a property transformation specification. In certain embodiments, the map table is pre-populated for a given instance of the system with a mapping either with or without using some a visualization tool that provides ease of selection and association of source entity properties with a target entity property and requisite methods to accomplish the system goals.

With embodiments, the target key is a primary key of the target system 170.

Embodiments perform entity function mapping. In certain embodiments, the mapping is defined at system (e.g., FIG. 1) configuration time. The map 222 defines the target functions and target parameters for those target functions. The map 222 defines the source functions and transformed data instances (e.g., type and schema). The map 222 defines how a source function maps to a target function. The map 222 defines how a transformed data instance maps to a target function parameter. The map defines the target function code to be executed through dynamic binding.

Embodiments map each source function/value to a target function/parameter. The target parameters for a given target function are grouped together so that one target function execution can be applied. Defaults, nulls, error generation or other techniques are used for any remaining unassigned parameters. In some embodiments, typical Domain Integrity rules may be used for unassigned parameters.

Figure 4:
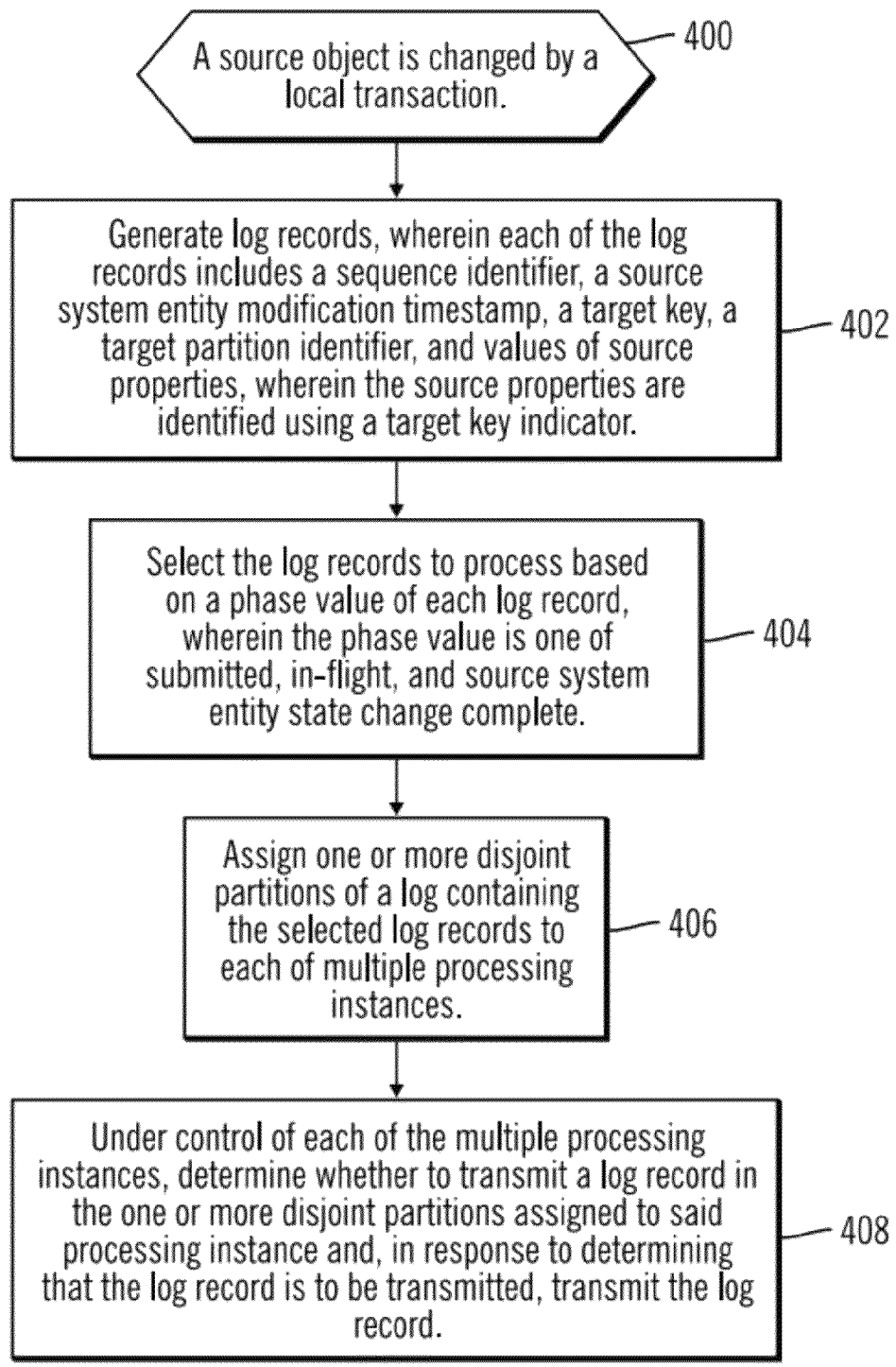
FIG. 4 illustrates processing in accordance with certain embodiments.

FIG. 4 illustrates processing in accordance with certain embodiments. Control begins at block 400 with a source object being changed by a local transaction executing on a source system 160. In block 402, the log generation component 110 generates log records, wherein each of the log records includes a sequence identifier, a source system entity modification timestamp, a target key, a target partition identifier, and values of source properties, wherein the source properties are identified using a target key indicator. In block 404, the log consumer component 120 selects the log records to process based on a phase value of each log record, wherein the phase value is one of submitted, in-flight, and source system entity state change complete. In block 406, the log consumer component 120 assigns one or more disjoint partitions to each of multiple processing instances. In block 408, under control of each of the multiple processing instances, the log optimizations component 130 determines whether to transmit a log record in the one or more disjoint partitions assigned to said processing instance, and, in response to determining that the log record is to be transmitted, transmits the log record.

Figure 5A:
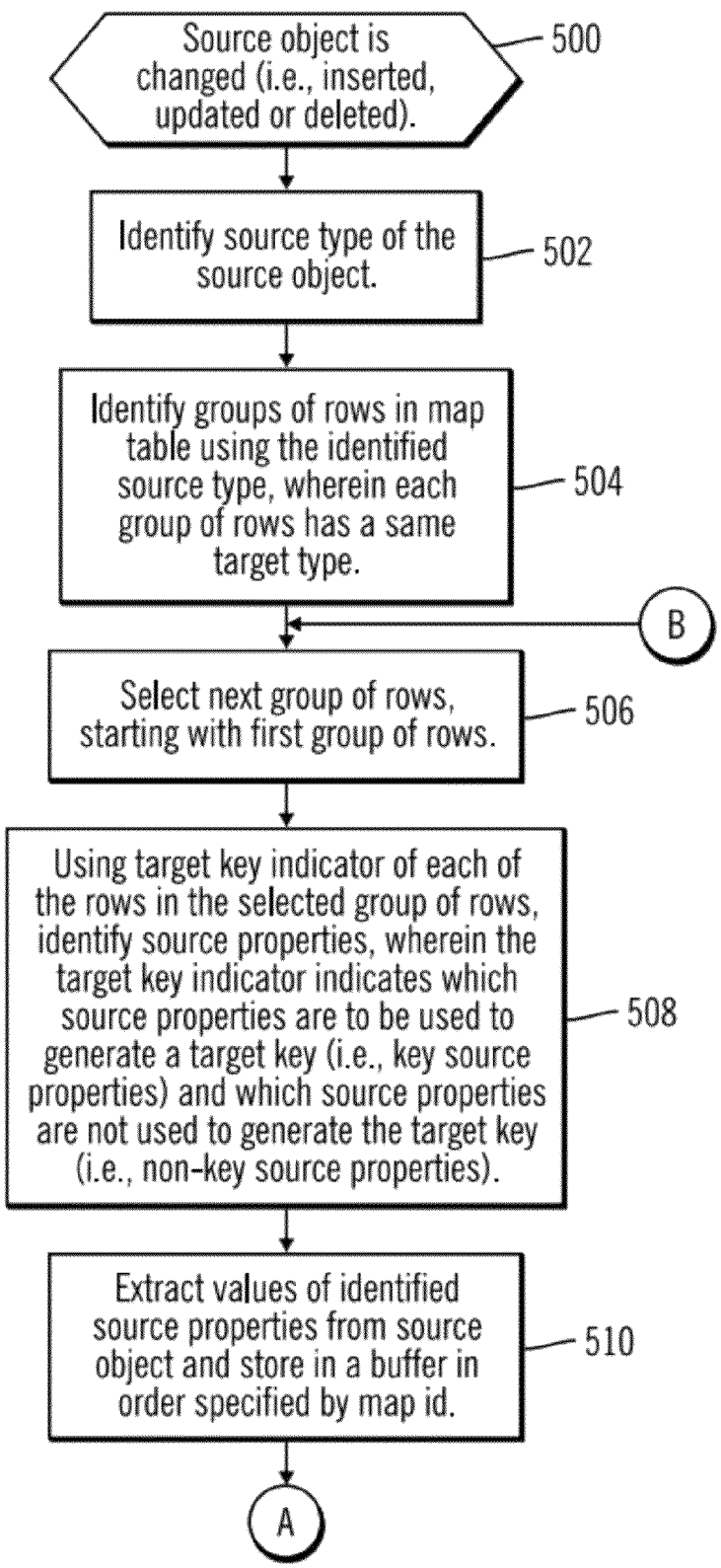
FIG. 5 illustrates logic for generating log records in accordance with certain embodiments.

FIG. 5 illustrates logic for generating log records in accordance with certain embodiments. Control begins at block 500 with a source object being changed (i.e., inserted (i.e., created), updated (i.e., modified) or deleted). For example, a source object is D3 in FIG. 3. In block 502, the log generation component 110 identifies the source type of the source object. In block 504, the log generation component 110 identifies groups of rows in the map table 340 using the identified source type, wherein each group of rows has a same target type. In block 506, the log generation component 110 selects a next group of rows, starting with a first group of rows. In certain embodiments, once rows with the source type are identified in the map table 340, the rows are sorted by target type to form groups of rows. Within each group of rows, the rows are sorted by ascending map identifier. Then, starting with the first group of rows, the log generation component 110 processes each row representing a property transformation specification.

In block 508, the log generation component 110 uses the target key indicator of each of the rows in the selected group of rows to identify source properties, wherein the target key indicator indicates which source properties are to be used to generate a target key (i.e., key source properties) and which source properties are not used to generate the target key (i.e., non-key source properties). For example, the target key indicator may provide a bit for each of a set of source properties, and, when the bit is set to "TRUE", the value of the associated source property is used to generate the target key.

Figure 5B:
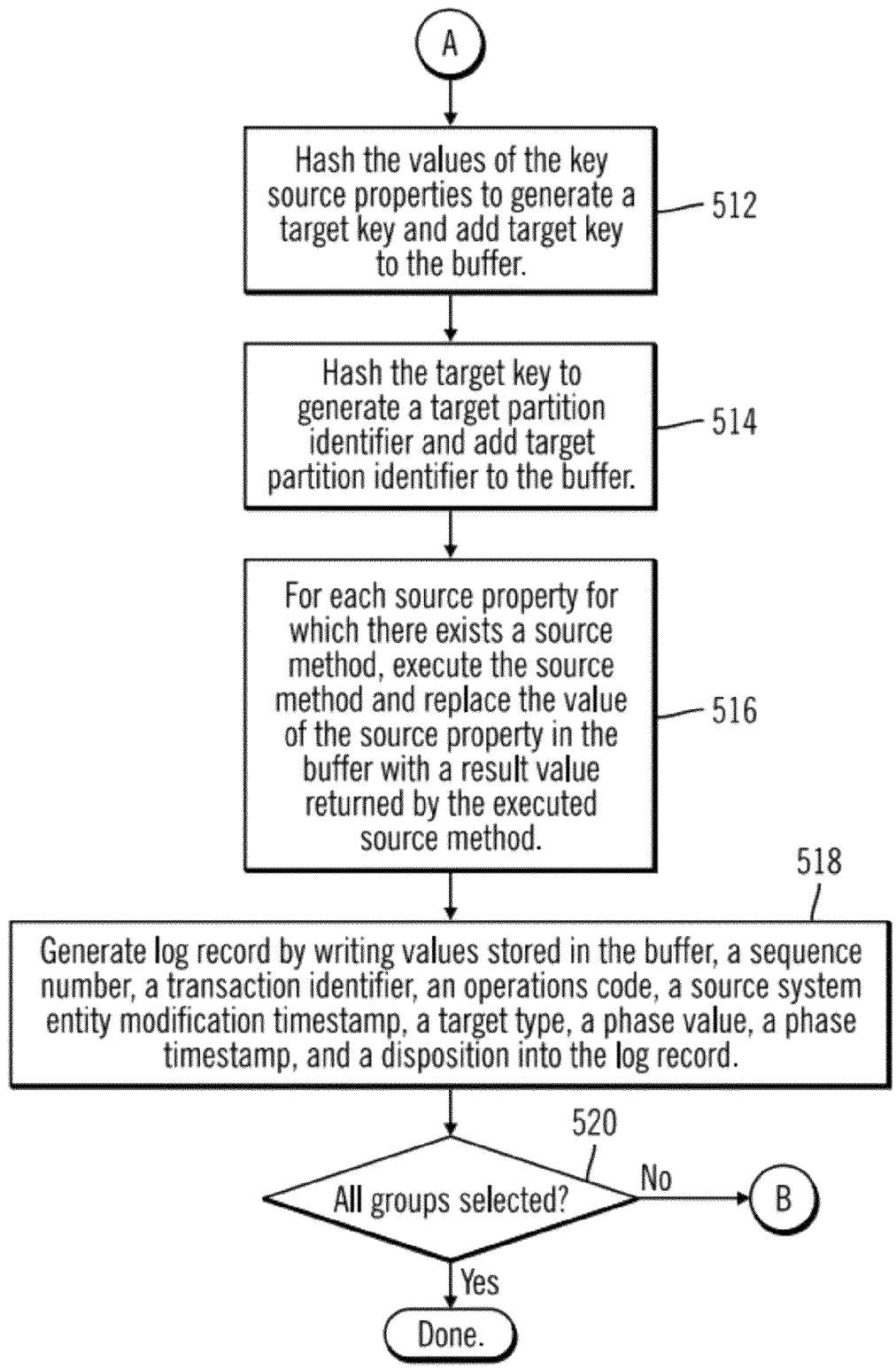

In block 510, the log generation component 110 extracts values of the identified source properties from the source object and stores the extracted values in a buffer in an order specified by the map identifier in each of the rows in the selected group. Processing continues from block 510 (FIG. 5A) to block 512 (FIG. 5B).

In block 512, the log generation component 110 hashes the values of the key source properties to generate a target key and adds the target key to the buffer. At this time, the buffer stores the values of the key source properties, the values of the non-key source properties, and the target key. In block 514, the log generation component 110 hashes the target key to generate a target partition identifier and adds the target partition identifier to the buffer. In certain embodiments, the number of partitions is pre-defined ("N"), and the hash used in block 514 generates a target partition identifier in the range of 0 to (N−1).

In block 516, the log generation component 110, for each source property for which there exists a source method, executes the source method and replaces the value of the source property in the buffer with the result value returned by the executed source method. That is, a source method may not exist for a particular source property.

At this time, the buffer stores the values of the key source properties, the values of the non-key source properties, the target key, and the target partition identifier. The values of the key source properties and the values of the non-key source properties form the intermediate form payload. In block 518, the log generation component 110 generates a log record by writing the values stored in the buffer, a sequence number, a transaction identifier, an operations code, a source system entity modification timestamp, a target type, a phase value that indicates a phase value of submitted, a phase timestamp, and a disposition into the log record. In some embodiment the sequence number is generated in accordance with an atomic monotonic sequence number generator of sufficiently large precision.

In block 520, the log generation component 110 determines whether all groups have been selected. If so, processing is done, otherwise, processing continues to block 506 to select another group of rows having a same target type.

Figure 6:
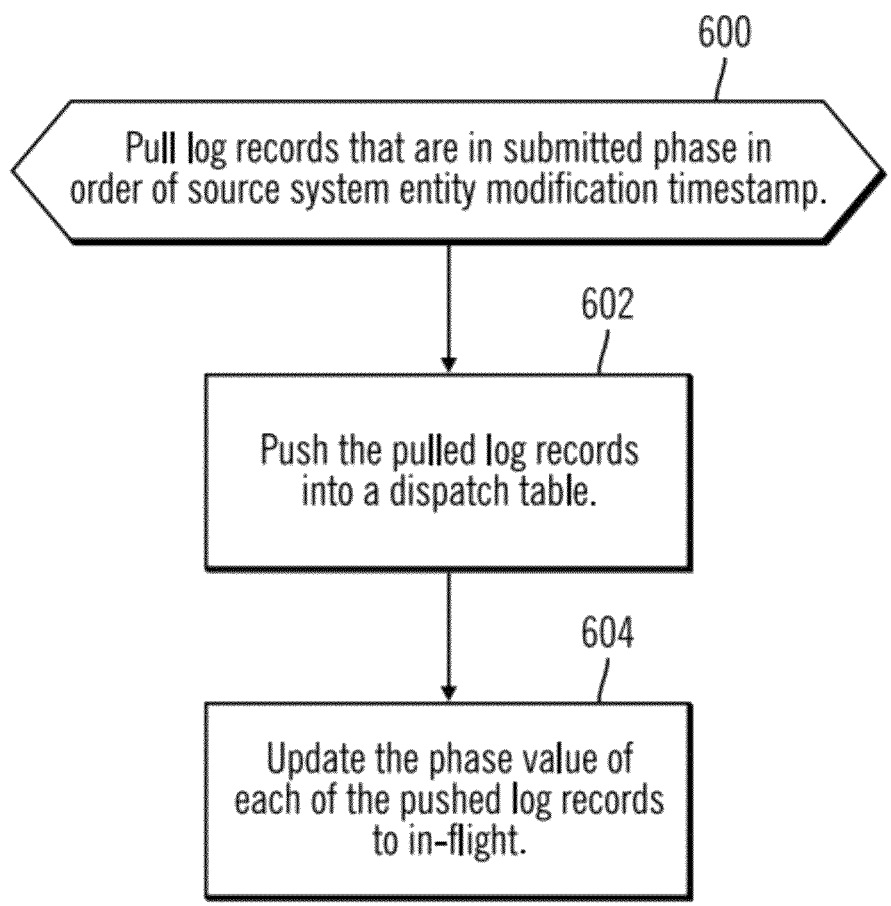
FIG. 6 illustrates logic for non-recovery processing log records in accordance with certain embodiments.

FIG. 6 illustrates logic for non-recovery processing log records in accordance with certain embodiments. The processing of FIG. 6 may be referred to as "normal" (i.e., non-recovery) processing. Control begins at block 600 with the log consumer component 120 pulling log records in the submitted phase (i.e., log records with a phase value of submitted) in order of source system entity modification timestamp. In block 602, the log consumer component 120, pushes the pulled log records into a dispatch table. In certain embodiments, the dispatch table is a hash table with buckets, and each of the pulled log records is stored in one of the buckets based on the target key of that log record. In block 604, log consumer component 120 updates the phase value of each of the pushed log records to in-flight. In certain other embodiments, a bucket is an ordered queue of log records in persistent storage, and the ordering is based on the sequence number and the source system entity modification timestamp of the log records.

Figure 7:
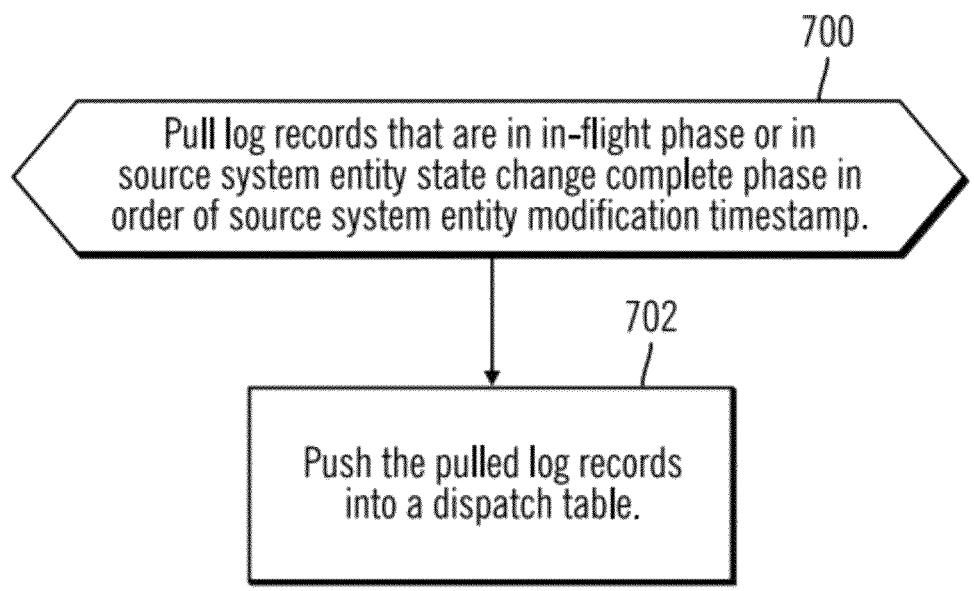
FIG. 7 illustrates logic for recovery processing in accordance with certain embodiments.

FIG. 7 illustrates logic for recovery processing in accordance with certain embodiments. Control begins at block 700 with the log consumer component 120 pulling log records in the in-flight phase or in the source system entity state change complete phase (i.e., log records with a phase value of in-flight or source system entity state change complete) in order of source system entity modification timestamp. In other embodiments, the log consumer component 120 may pull log records in order of sequence number. In block 702, the log consumer component 120 pushes the pulled log records into the dispatch table. For example, if there has been a cold start from a prior crash restart, then some of the log records may or may not be in complete phase (e.g., they are in one of the phases of in-flight or source system entity state change complete), and these log records are pulled for processing to complete the incomplete phases to take the records to the completed phase appropriately. In the prior art, a two phased commit would be performed. On the other hand, providing data integrity with stored phase information avoids using the two phased commit.

In certain embodiments, for a given set of transactions, the log consumer component 120 finds transactions modifying the same key values in the source or finds transactions executing the same target with the same parameter values for one or more parameters. These identified transactions are executed serially in the original transaction order. Other transactions may be executed in any order.

Figure 8A:
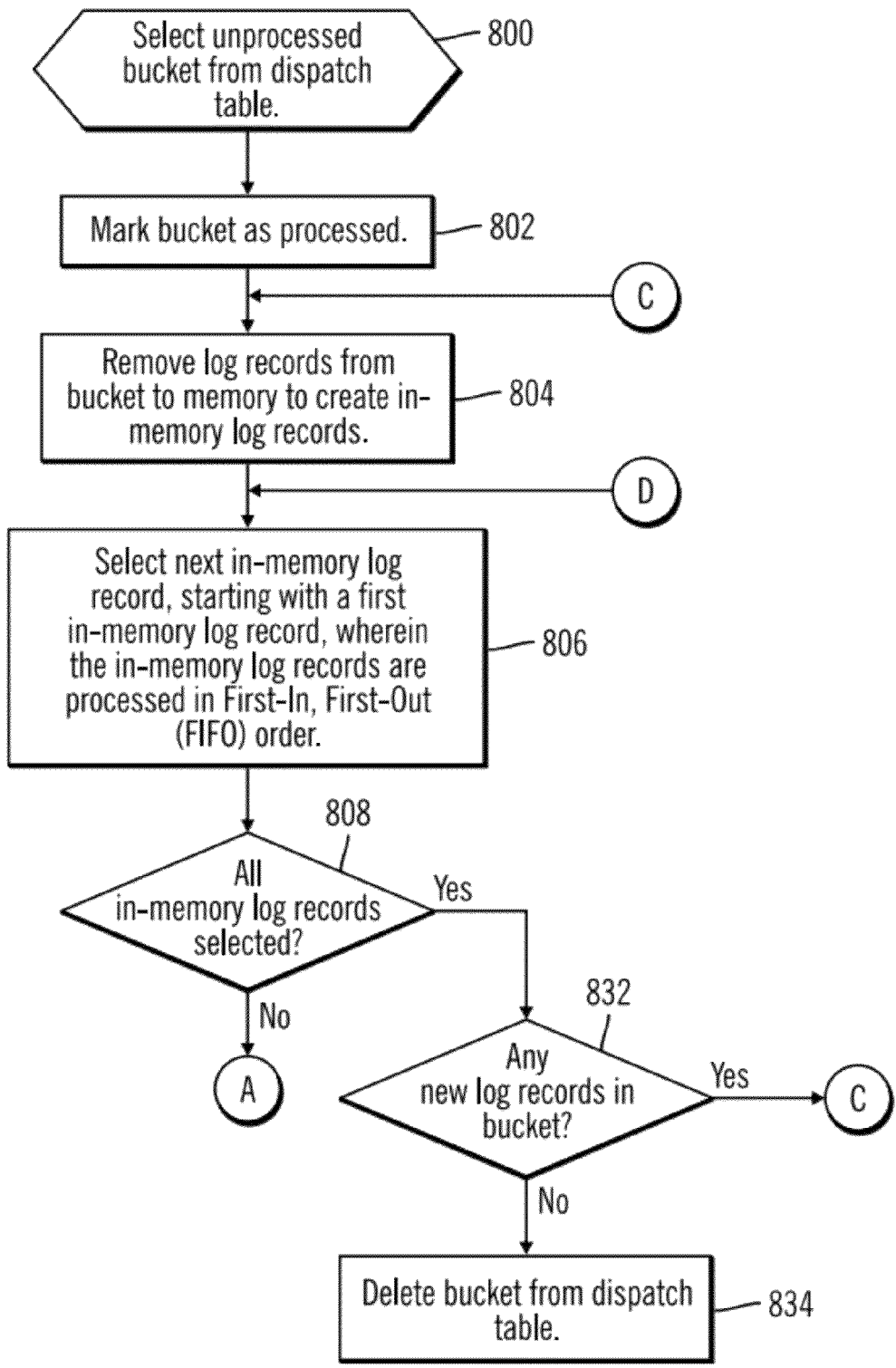
FIG. 8 illustrates logic for transmitting log to a target system records in accordance with certain embodiments.
Figure 8B:
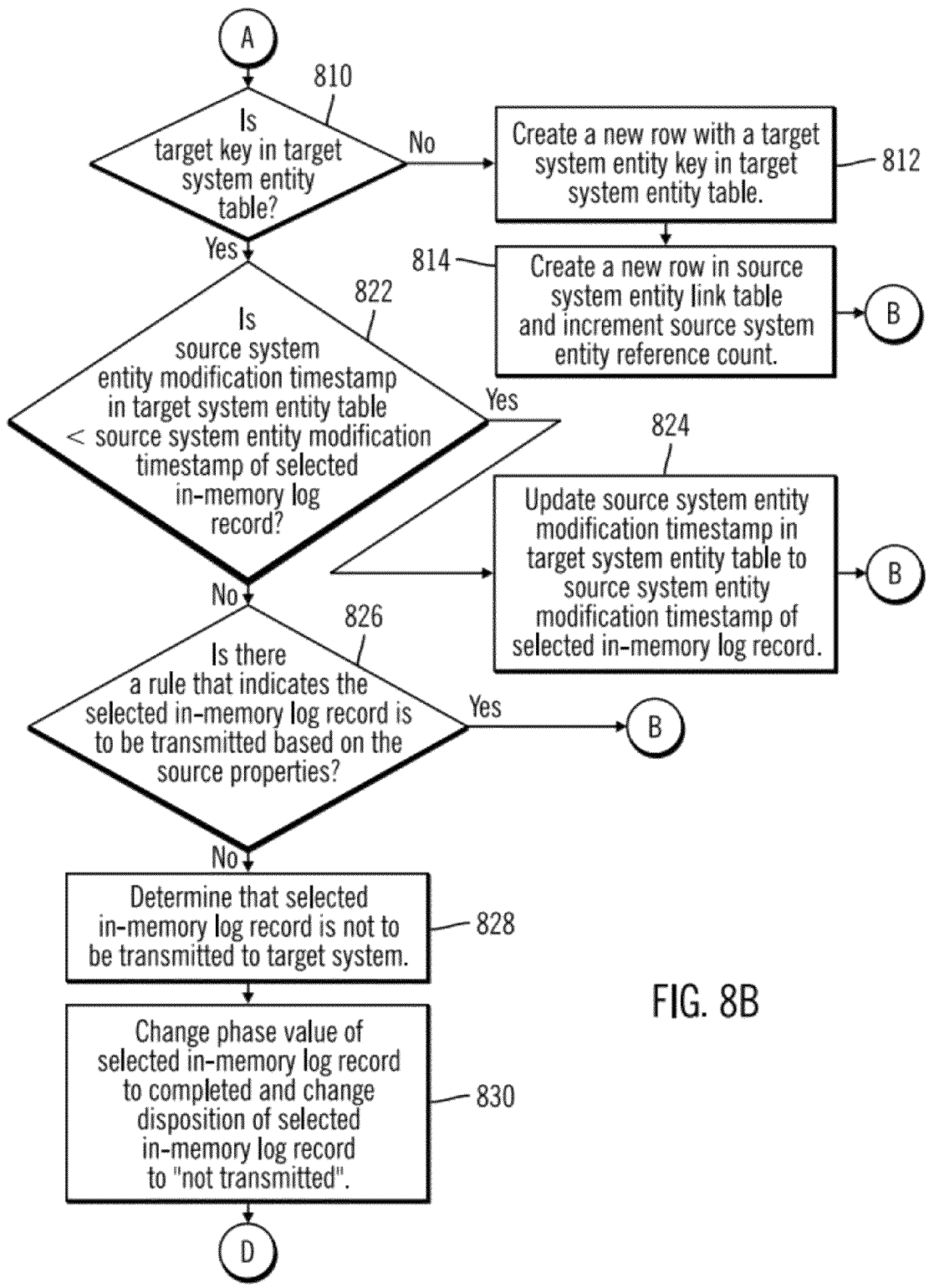

FIG. 8 illustrates logic for transmitting log records to the target system 170 in accordance with certain embodiments. Control begins at block 800 with log optimizations component 130 selecting an unprocessed bucket from the dispatch table. In block 802, the log optimizations component 130 marks the bucket as processed. In certain embodiments, the bucket may be marked as either processed or un-processed. In block 804, the log optimizations component 130 removes the log records from the bucket to memory to create in-memory log records. In block 806, the log optimizations component 130 selects the next in-memory log record starting with a first in-memory log record, wherein the in-memory log records are processed in First-In, First-Out (FIFO) order. In block 808, the log optimizations component 130 determines whether all in-memory log records have been selected. If so, processing continues to block 832, otherwise, processing continues to block 810 (FIG. 8B).

In block 832, the log optimizations component 130 determines whether there are any new log records in the bucket. If so, processing continues to block 804, otherwise, processing continues to block 834. In block 834, the log optimizations component 130 deletes the bucket from the dispatch table.

Thus, once a bucket is deleted, the log optimizations component 130 selects another bucket for processing according to the logic of FIG. 8. In this manner, the log optimizations component 130 processes buckets, one by one.

In block 810 (FIG. 8B), the log optimizations component 130 determines whether the target key is in the target system entity table 310. If so, processing continues to block 820, otherwise, processing continues to block 812. That is, if the target key is in the target system entity table 310, the log optimizations component 130 performs additional processing to determine whether this log record should be transmitted or not. If the target key is not in the target system entity table 310, the log optimizations component 130 determines that this log record is to be transmitted.

Figure 8C:
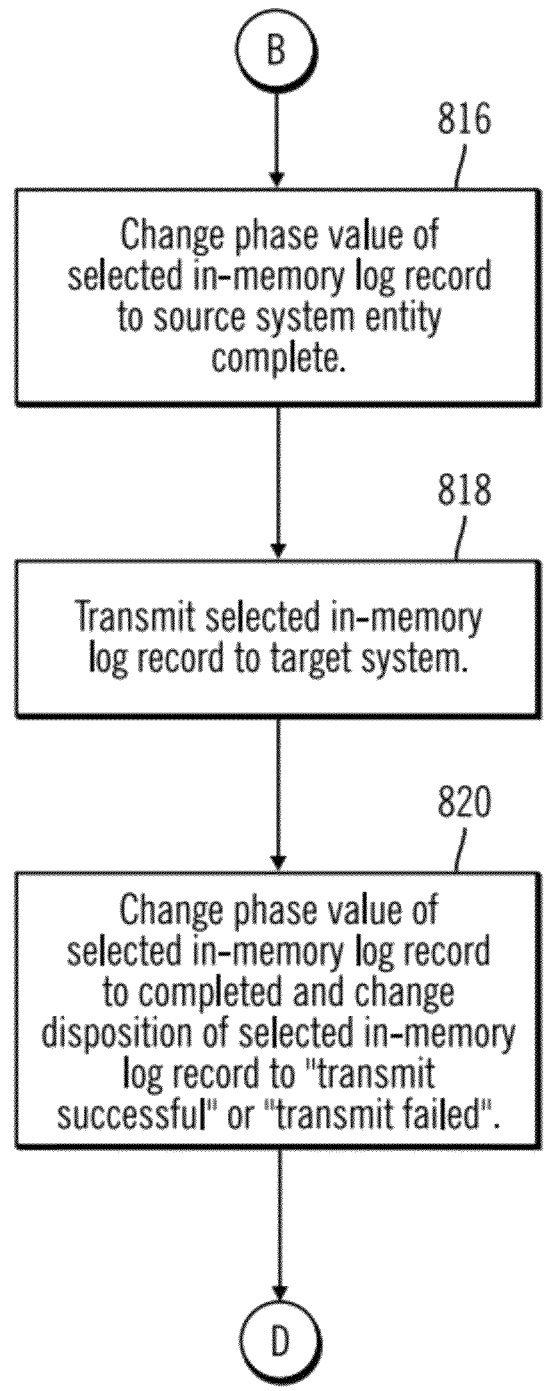

In block 812, the log optimizations component 130 creates a new row with a target key in the target system entity table 310 for the selected in-memory log record. In block 814, the log optimizations component 130 creates a new row in the source system entity link table 320 and increments a source system entity reference count in the target system entity table. From block 814, processing continues to block 816 (FIG. 8C).

In block 816, the log optimizations component 130 changes the phase value of the selected in-memory log record to source system entity complete. In block 818, the log optimizations component 130 transmits the selected log record to the target system 170. Further details of the processing of block 818 are described with reference to FIG. 9. In block 820, the log optimizations component 130 changes the phase value of the selected in-memory log record to completed and changes the disposition of the selected in-memory log record to "transmit successful" or "transmit failed", depending on whether the transmit was successful or failed. From block 820, processing continues to block 806 (FIG. 8A).

Returning to FIG. 8B, in block 822, the log optimizations component 130 determines whether the source system entity modification timestamp in the target system entity table 310 is less than (i.e., "<") the source system entity modification timestamp of the selected in-memory log record. If so, processing continues to block 824, otherwise, processing continues to block 826. In block 824, the log optimizations component 130 updates the source system entity modification timestamp in the target system entity table 310 to the source system entity modification timestamp of selected in-memory log record. From block 824, processing continues to block 816 (FIG. 8C).

In block 826, the log optimizations component 130 determines whether there is a rule that indicates the selected in-memory log record is to be transmitted. If so, processing continues to block 816 (FIG. 8C), otherwise, processing continues to block 828. In block 828, the log optimizations component 130 determines that the selected in-memory log record is not to be transmitted to the target system 170. In block 830, the log optimizations component 130 changes the phase value of the selected in-memory log record to completed and changes the disposition of the selected in-memory log record to "not transmitted".

As an example, source local applications at the source system 160 issue transactions that modify documents used for identification, forms, claims or some other artifact. For this example, FIG. 5 shows how data is collected from the source local applications that issue the transactions; FIG. 6 shows how correct ordering is maintained so integrity of source local documents for identity, forms, claims or other artifacts is maintained in the target system 170; FIG. 7 shows how, even in system failure cases, the data integrity is maintained and operations can be resumed after the failure has been corrected; FIG. 8 shows how optimizations work (e.g., duplicate identity documents (e.g., drivers license, passport, etc.) while different in detail might all be treated the same and may not need to be transmitted); and, with reference to FIG. 9, the target system 170 may have APIs (e.g., webservices based APIs around capabilities such as "add a party") that can be automatically invoked.

Figure 9:
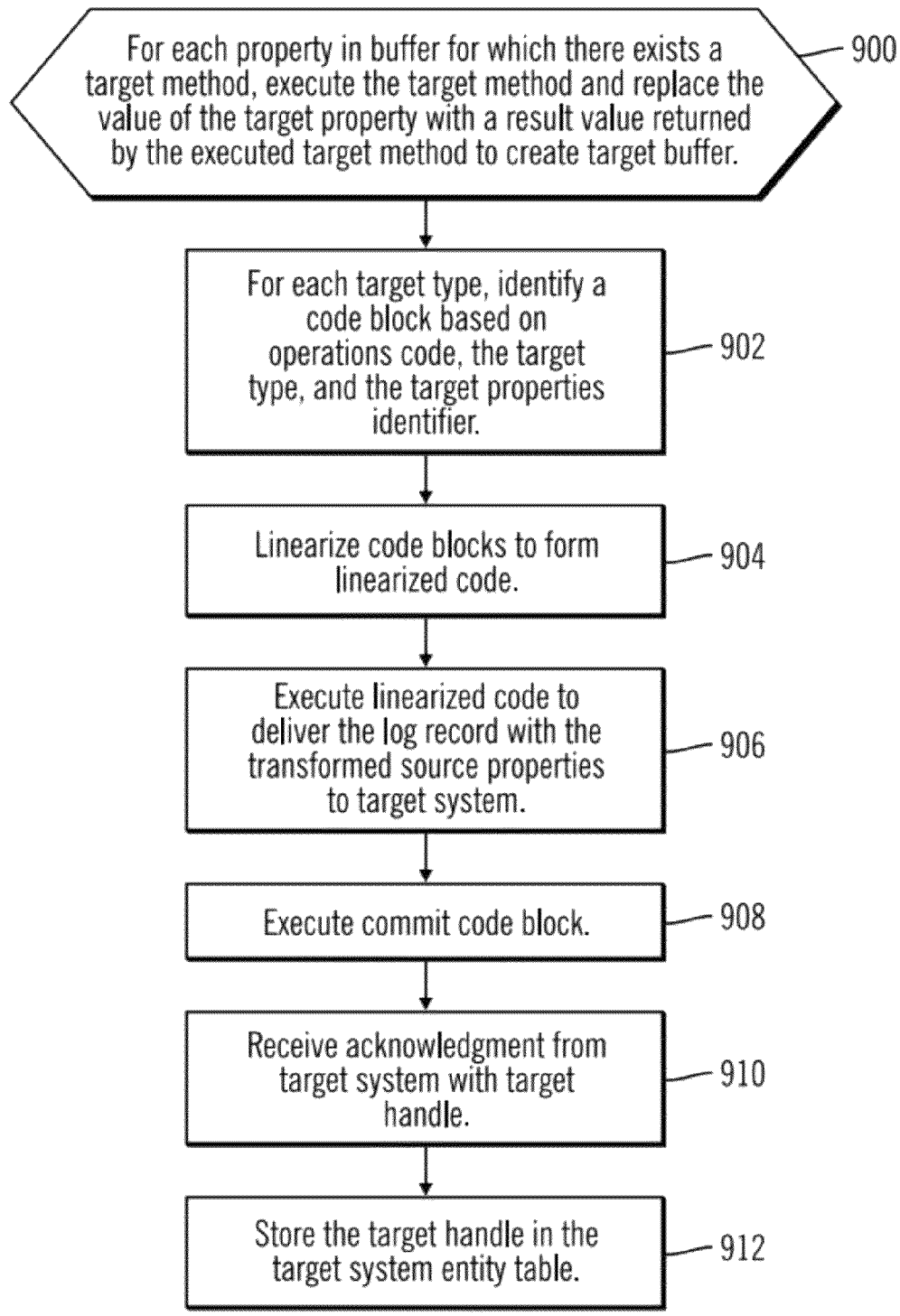
FIG. 9 illustrates detailed logic for transmitting a log record in accordance with certain embodiments.

FIG. 9 illustrates detailed logic for transmitting a log record in accordance with certain embodiments. Control begins at block 900, for each property in the buffer for which there exists a target method, with the target system transforms component 140 executing the target method and replacing the value of the target property with the result value returned by the executed target method to create a target buffer. Thus, the values of the source properties are transformed. In block 902, for each target type, the target system transforms component 140 identifies a code block based on the operations code, the target type, and the target properties identifier in the log record. In block 904, the target system transforms component 140 linearizes the code blocks to form linearized code. A code block may also be described as a target interface. In block 906, the target system transforms component 140 executes the linearized code to deliver the log record with the transformed source properties to the target system 170. In certain embodiments, the execution uses a target system API to deliver the log record. For example, the target system transforms component 140 may branch to the linearized code and begin execution. In block 908, the target system transforms component 140 executes a commit code block for the target system 170. In block 910, the target system transforms component 140 receives an acknowledgment from the target system 170. In block 912, the target system transforms component 140 stores the target handle in the target system entity table 310.

Thus, the target system transforms component 140 executes the generated linearized code with the identified parameters. The target system transforms component 140 provides several extensibility points that are provided to ensure that not only data transformations are applied, but also that the right local calls to the target system 160 are invoked with the transformed data. Those local calls ensure that any additional semantics that are to be applied can be injected in to the overall flow correctly to maintain local integrity and local optimization.

By including the target interfaces (i.e., the code blocks) and plugging the transformed values into the parameters (i.e., properties), this minimizing programming that would otherwise have to done.

Figure 10:
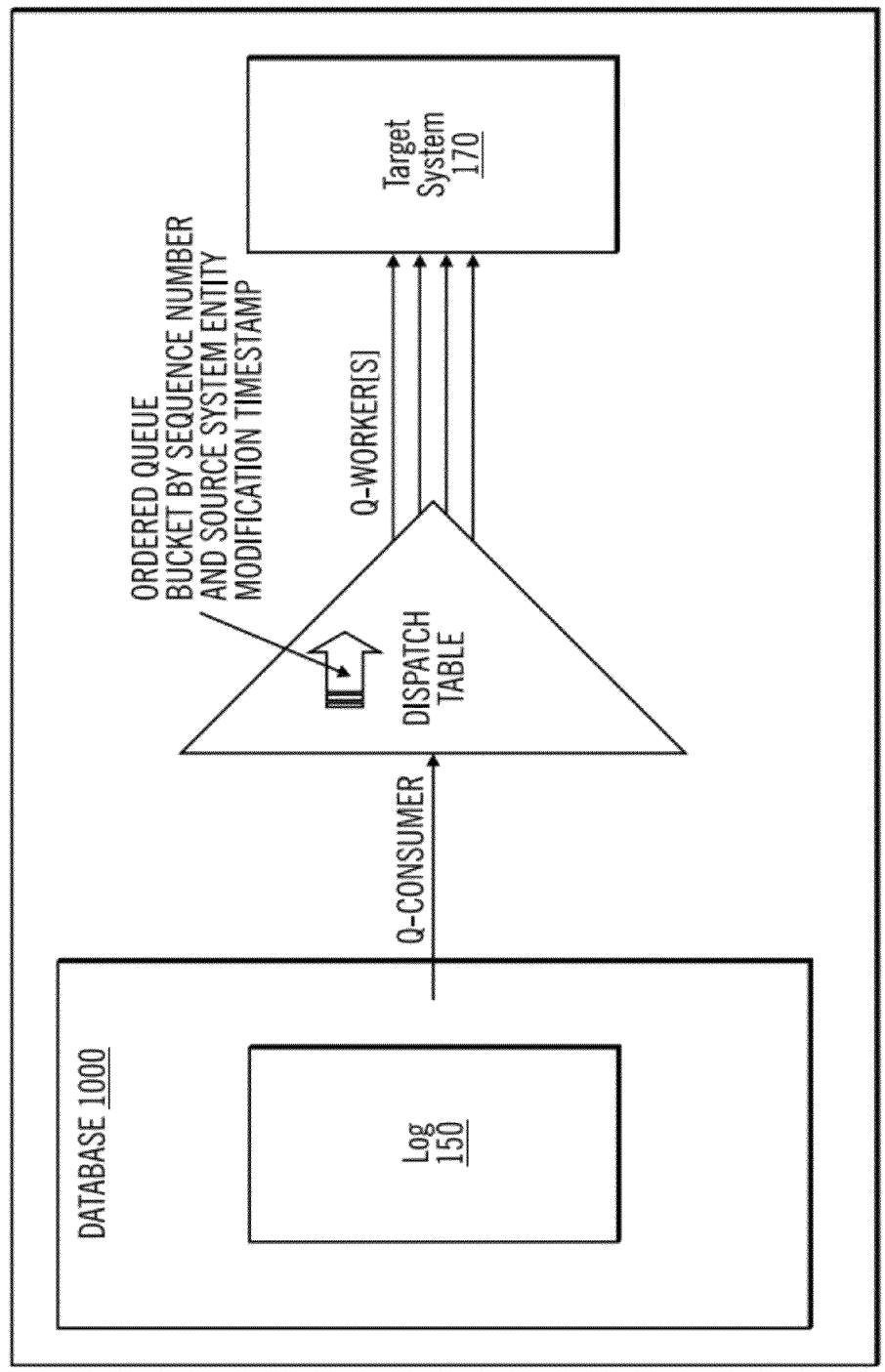
FIG. 10 illustrates a scaled up system in accordance with certain embodiments.

FIG. 10 illustrates a scaled up system in accordance with certain embodiments. In certain embodiments, the log 150 is stored in the source system 160 database 1000. In certain embodiments, the log consumer component 120 is structured with a single queue consumer thread and multiple queue worker threads that are user configurable. The queue consumer thread populates a dispatch table (e.g., an in-memory hash table). In certain embodiments, a processing instance of the system may be described as including a queue consumer thread, multiple queue worker threads, and a dispatch map.

The dispatch table has a multiplicity of hash buckets each of which can be directly addressed with a key. The key used is the log record target key value. A hash bucket contains a single ordered queue. Each ordered queue in a bucket is associated with a specific target key. Each ordered queue can have a multiplicity of in-memory log record entries all with the same target key. These entries are kept in order. Each in-memory log record in this queue is a deliverable log row to the target system 160. The in-memory log records in the queue are ordered by either sequence number or the source system entity modification timestamp. In certain embodiments, the number of buckets fixed for the dispatch table is configurable The one or more queue worker threads consume the in-memory records in order and in parallel from the hash buckets within the dispatch map and proceed to deliver the in-memory log records to the target system 160 using the flow described in FIG. 9 and subsequently mark the log row as in completed phase with or without error.

In certain embodiments, the log 150 dispatch to the target system 170 is single threaded, in the order in which the target system 170 is to process the transactions. The queue worker thread marks the log 150 to completed phase when the target system type handler returns a handle.

Figure 11:
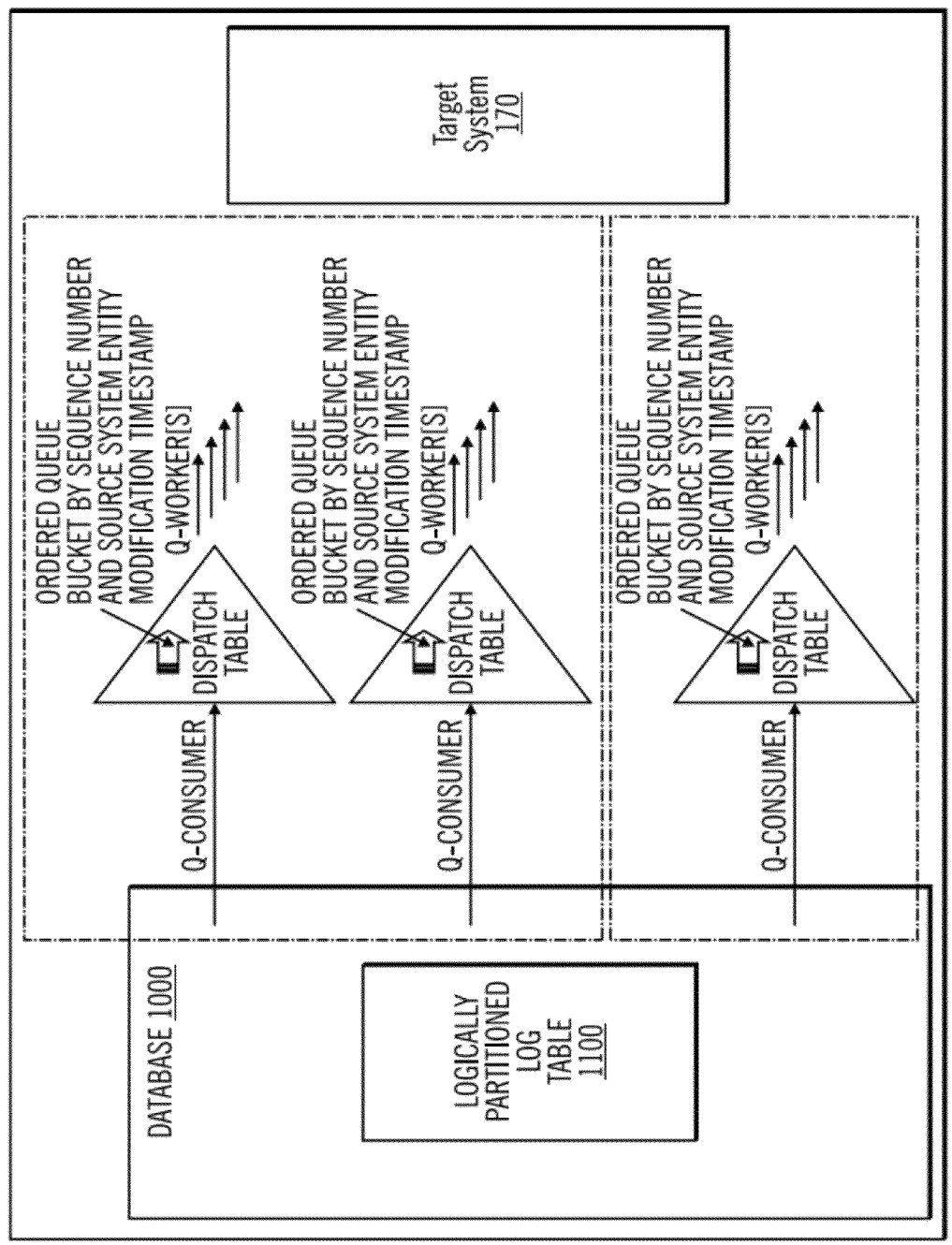
FIG. 11 illustrates a scaled out system in accordance with certain embodiments.

FIG. 11 illustrates a scaled out system in accordance with certain embodiments. A logically partitioned log table 1100 is stored in a database 1000. In certain embodiments, each queue consumer thread is assigned a disjoint set of partitions. That is, there may be more partitions than there are queue consumers. N may be set at product burn or at product deployment/install time taking into consideration site factors of node capability for achievable parallelism and actual target system 160 throughput. In FIG. 11, there are multiple processing instances, and each of the processing instances is assigned one or more partitions. Embodiments enable better parallelism without loss of order or integrity by enabling the reordering of transactions without losing system data integrity. This is accomplished as a result of blocks 512 and 514 in FIG. 5. The processing of blocks 512 and 514 generate the partition identifiers that are then used in FIG. 11. In FIG. 11, the partitions are distributed amongst parallel processing instances. Thus, embodiments use partitions based on the hash value described in blocks 512 and 514, and then partitions are distributed across parallel threads described in FIG. 11.

Moreover, the transaction reordering enables distributing the workload over more partitions than would otherwise normally occur, and this leads to better parallelism.

For scaleup and scaleout, the target system 170 is idempotent to operations with the same target key.

Embodiments identify technology that enables an efficient and reliable way of achieving the root capability of sharing, transformation, and local use of information. Embodiments provide an ability to program an application or deployment specific extensibility in the data transformation (to retain the local optimizations of how data is represented for local applications).

With embodiments, data is transformed from a source system 160 to a target system 170, where it is assumed that each entity has an associated key. In certain embodiments, the source key and the target key are the same. This can simplify type transformation or more sophisticated data model transformations. In certain embodiments, it can be a combination of both type and data model transformations that are required due to the fundamental and non-standard data models provided by certain systems. With embodiments, the specific technique of transformation may include techniques available in the current art, including Extensible Stylesheet Language Transformations (XSLT). Embodiments assume that a design time technique of specifying one or more transformations is provided and a runtime execution technique of applying the transformation efficiently exists.

Embodiments provide an ability to optimize the order in which data transformations are applied that still results in strong data integrity, while enabling efficient parallelism that is not available in conventional systems.

With embodiments, new transactions, with fully optimized parallelism are detected on the source system 160. This is a property built into the source system 160 end and no special user customization is required to applications on the source system 160 end. Embodiments recognize that transactions are to be applied in order of target key value, not necessarily in order of original change order of the source system 160.

For example, imagine a source system entity instance 210 had two transactions S1, S2 executed in that temporal order, where S1 updated a source system entity instance 210 with property values P1="a", P2="b", and S2 updated the same source system instance 210 with property values P1="b", P2="d". If the target system entity instance 290 uses a transformation for P1 that maps P1 to the primary key of the target system entity instance 290, then, in this case embodiments apply the target system transactions R1 and R2 in any target transaction order. This is allowed because although S1, S2 affected the same source system entity instance 210, the target transactions would in essence affect independent target system entity instances. If however S1 and S2 both updated P1="a", then the target system transactions R1, R2 are applied in the source system entity instance 210 order, since the target transaction is affecting the same target system instance 290.

In another example, there are two transactions S1 and S2 occurring randomly on two independent source system entity instances, where P1="a" and P2="b" in the first source system entity instance and P1="a" and P2="c" in the second source system entity instance, then the target system transactions R1 and R2 follow the same natural order in which S1 and S2 actually occurred in the source system entity instances. This is because two source system entity instances have affected the same target system entity instance.

Embodiments provide are several techniques that are possible for ordering the target transactions and determining which ones are independent based on the high level design criteria. These techniques change depending on the throughput requirements required for the overall system demanding scaleup and scaleout approaches.

With embodiments, transactions are applied using the transformed data obtained by executing extensible transformation procedures. Embodiments use a log 150 (which may be a data directed table to determine which function is appropriate to call. This function can be linked at runtime and can be application or deployment specific.

Embodiments are applicable to general information management (e.g., DBMS) scenarios where entity and model transformations in the context of replication and transactions are common. For example building a data warehouse or building a target system 160 is another application of the embodiments disclosed herein.

Embodiments enable fewer servers to be required, require less monitoring and management of those servers, and enable more servers to be applied if needed.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 12:
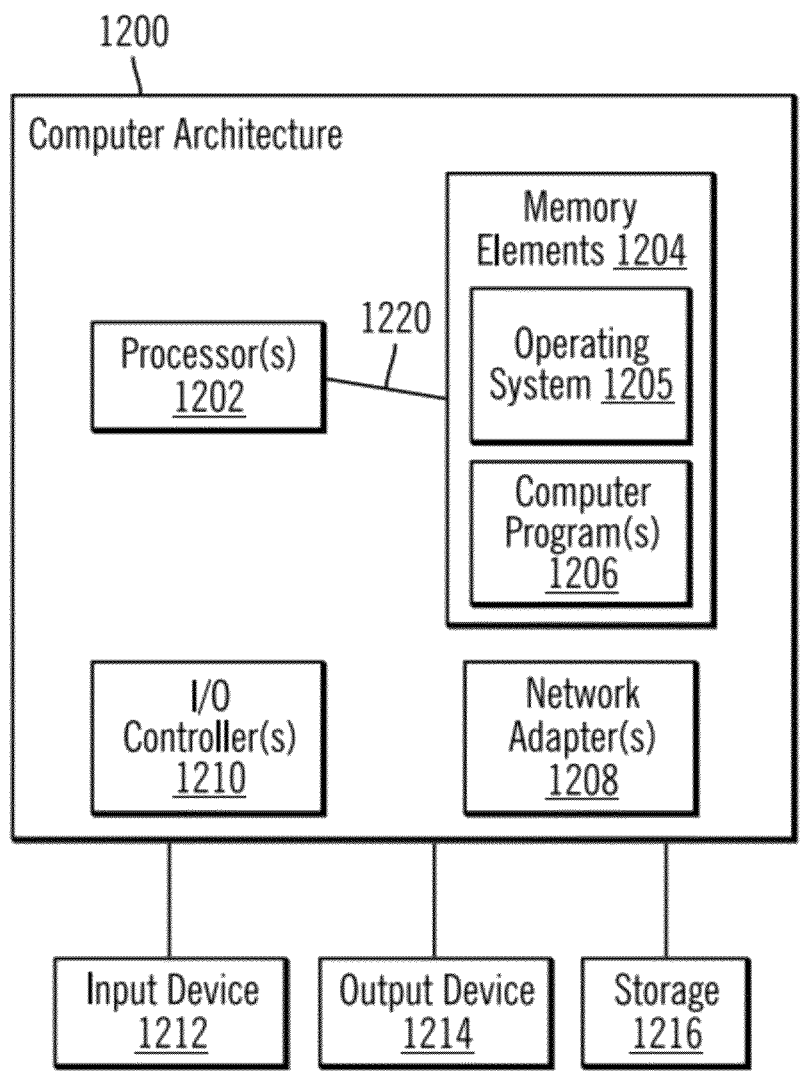
FIG. 12 illustrates a system architecture that may be used in accordance with certain embodiments.

FIG. 12 illustrates a system architecture 1200 that may be used in accordance with certain embodiments. Computing device 100, source system 160, and/or target system 170 may implement system architecture 1200. The system architecture 1200 is suitable for storing and/or executing program code and includes at least one processor 1202 coupled directly or indirectly to memory elements 1204 through a system bus 1220. The memory elements 1204 may include local memory employed during actual execution of the program code, bulk storage, and cache memories which provide temporary storage of at least some program code in order to reduce the number of times code must be retrieved from bulk storage during execution. The memory elements 1204 include an operating system 1205 and one or more computer programs 1206.

Input/Output (I/O) devices 1212, 1214 (including but not limited to keyboards, displays, pointing devices, etc.) may be coupled to the system either directly or through intervening I/O controllers 1210.

Network adapters 1208 may also be coupled to the system to enable the data processing system to become coupled to other data processing systems or remote printers or storage devices through intervening private or public networks. Modems, cable modem and Ethernet cards are just a few of the currently available types of network adapters 1208.

The system architecture 1200 may be coupled to storage 1216 (e.g., a non-volatile storage area, such as magnetic disk drives, optical disk drives, a tape drive, etc.). The storage 1216 may comprise an internal storage device or an attached or network accessible storage. Computer programs 1206 in storage 1216 may be loaded into the memory elements 1204 and executed by a processor 1202 in a manner known in the art.

The system architecture 1200 may include fewer components than illustrated, additional components not illustrated herein, or some combination of the components illustrated and additional components. The system architecture 1200 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method, comprising:
under control of a processing instance among multiple processing instances that is assigned to process a partition of log records,
processing, through a plurality of phases, a log record from the partition of log records based on a phase value of the log record, wherein the phase value is set to one of submitted when the log record has been generated, in-flight when the log record is pushed to a dispatch table, source system entity state change complete when the log record is ready to be transmitted, and target system entity state change complete when the log record processing has been completed.

2. The method of claim 1, further comprising:
using a target key indicator to identify some source properties of a source object associated with the log record as key source properties and remaining source properties of the source object as non-key source properties;
generating a target key using the key source properties; and
generating an identifier for the partition of log records using the target key.

3. The method of claim 1, further comprising:
for a source property of a source object associated with the log record for which there exists a source method and that has a value, executing the source method and replacing the value of the source property with a result value returned by the executed source method.

4. The method of claim 1, further comprising:
for a source property of a source object associated with the log record for which there exists a target method and that has a value, executing the target method and replacing the value of the source property with a result value returned by the executed target method.

5. The method of claim 1, wherein each of the multiple processing instances performs processing in parallel.

6. The method of claim 1, further comprising:
performing recovery by processing log records based on the phase value of each of the log records.

7. The method of claim 1, further comprising:
in response to determining that a target key of the log record is not in a target system entity table, transmitting the log record to the target system; and
in response to determining that the target key of the log record is in the target system entity table and determining that a source system entity modification timestamp in the target system entity table is less than a source system entity modification timestamp in the log record, transmitting the log record to the target system.

8. The method of claim 7, further comprising:
in response to determining that the source system entity modification timestamp in the target system entity table is not less than the source system entity modification timestamp in the selected log record and determining that there is a rule that indicates that the log record is to be transmitted based on the source properties, transmitting the log record to the target system.

9. A system, comprising:
a processor; and
storage coupled to the processor, wherein the storage stores a computer program, and wherein the processor executes the computer program to perform operations, the operations comprising:
under control of a processing instance among multiple processing instances that is assigned to process a partition of log records,
processing, through a plurality of phases, a log record from the partition of log records based on a phase value of the log record, wherein the phase value is set to one of submitted when the log record has been generated, in-flight when the log record is pushed to a dispatch table, source system entity state change complete when the log record is ready to be transmitted, and target system entity state change complete when the log record processing has been completed.

10. The system of claim 9, wherein the operations further comprise:
using a target key indicator to identify some source properties of a source object associated with the log record as key source properties and remaining source properties of the source object as non-key source properties;
generating a target key using the key source properties; and
generating an identifier for the partition of log records using the target key.

11. The system of claim 9, wherein the operations further comprise:
for a source property of a source object associated with the log record for which there exists a source system and that has a value, executing the source system and replacing the value of the source property with a result value returned by the executed source system.

12. The system of claim 9, wherein the operations further comprise:
for a source property of a source object associated with the log record for which there exists a target system and that has a value, executing the target system and replacing the value of the source property with a result value returned by the executed target system.

13. The system of claim 9, wherein each of the multiple processing instances performs processing in parallel.

14. The system of claim 9, wherein the operations further comprise:
performing recovery by processing log records based on the phase value of each of the log records.

15. The system of claim 9, wherein the operations further comprise:
in response to determining that a target key of the log record is not in a target system entity table, transmitting the log record to the target system; and
in response to determining that the target key of the log record is in the target system entity table and determining that a source system entity modification timestamp in the target system entity table is less than a source system entity modification timestamp in the log record, transmitting the log record to the target system.

16. The system of claim 15, wherein the operations further comprise:
in response to determining that the source system entity modification timestamp in the target system entity table is not less than the source system entity modification timestamp in the log record and determining that there is a rule that indicates that the log record is to be transmitted based on the source properties, transmitting the log record to the target system.

17. A computer program product comprising a tangible computer readable storage medium including a computer readable program, wherein the computer readable program when executed by a processor on a computer causes the computer to perform:
under control of a processing instance among multiple processing instances that is assigned to process a partition of log records, processing, through a plurality of phases, a log record from the partition of log records based on a phase value of the log record, wherein the phase value is set to one of submitted when the log record has been generated, in-flight when the log record is pushed to a dispatch table, source system entity state change complete when the log record is ready to be transmitted, and target system entity state change complete when the log record processing has been completed.

18. The computer program product of claim 17, wherein the computer readable program when executed by the processor on the computer causes the computer to perform:
using a target key indicator to identify some source properties of a source object associated with the log record as key source properties and remaining source properties of the source object as non-key source properties;
generating a target key using the key source properties; and
generating an identifier for the partition of log records using the target key.

19. The computer program product of claim 17, wherein the computer readable program when executed by the processor on the computer causes the computer to perform:
for a source property of a source object associated with the log record for which there exists a source computer program product and that has a value, executing the source computer program product and replacing the value of the source property with a result value returned by the executed source computer program product.

20. The computer program product of claim 17, wherein the computer readable program when executed by the processor on the computer causes the computer to perform:
for a source property of a source object associated with the log record for which there exists a target computer program product and that has a value, executing the target computer program product and replacing the value of the source property with a result value returned by the executed target computer program product.

21. The computer program product of claim 17, wherein each of the multiple processing instances performs processing in parallel.

22. The computer program product of claim 17, wherein the computer readable program when executed by the processor on the computer causes the computer to perform:
performing recovery by processing log records based on the phase value of each of the log records.

23. The computer program product of claim 17, wherein the computer readable program when executed by the processor on the computer causes the computer to perform:
in response to determining that a target key of the log record is not in a target system entity table, transmitting the log record to the target system; and
in response to determining that the target key of the log record is in the target system entity table and determining that a source system entity modification timestamp in the target system entity table is less than a source system entity modification timestamp in the log record, transmitting the log record to the target system.

24. The computer program product of claim 23, wherein the computer readable program when executed by the processor on the computer causes the computer to perform:
in response to determining that the source system entity modification timestamp in the target system entity table is not less than the source system entity modification timestamp in the log record and determining that there is a rule that indicates that the log record is to be transmitted based on the source properties, transmitting the log record to the target system.

* * * * *